Patented July 3, 1928.

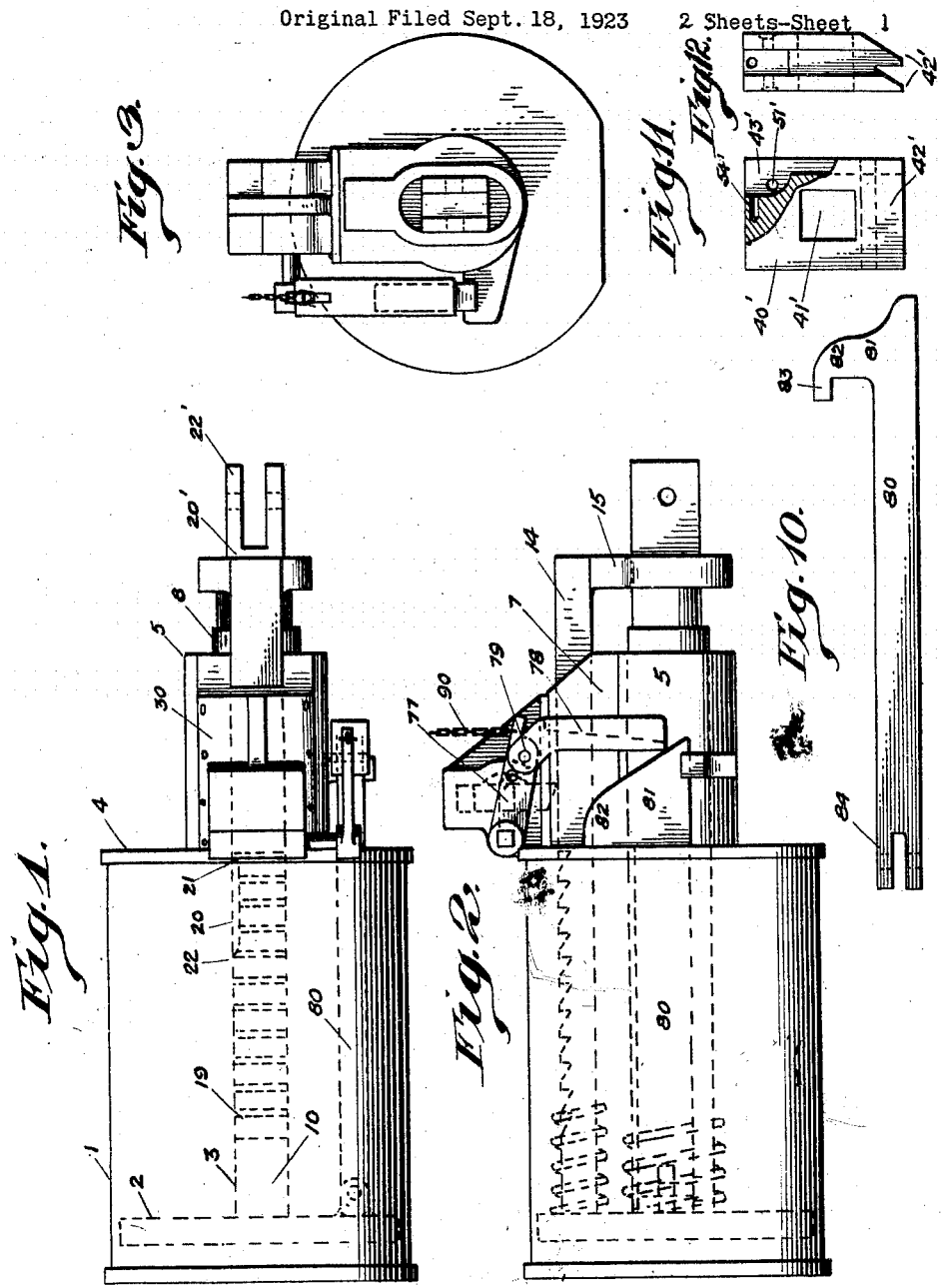

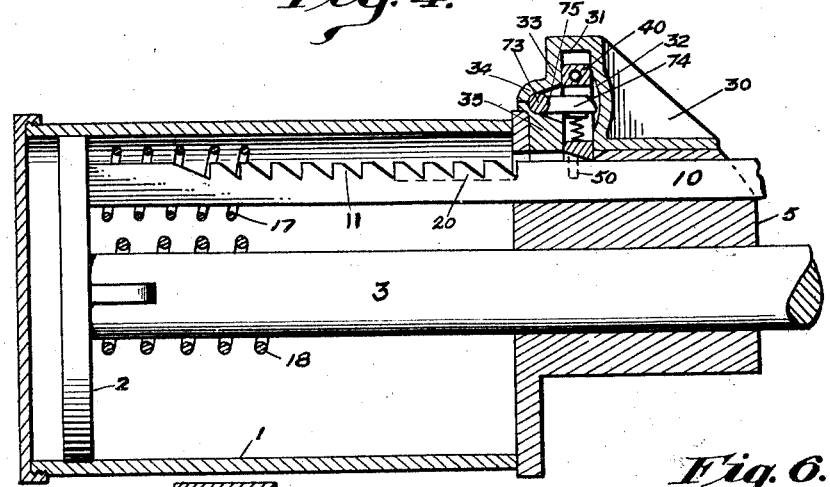
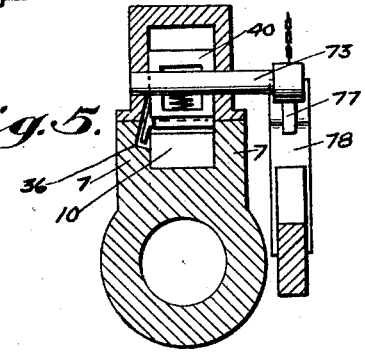
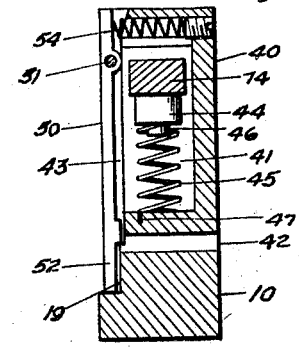
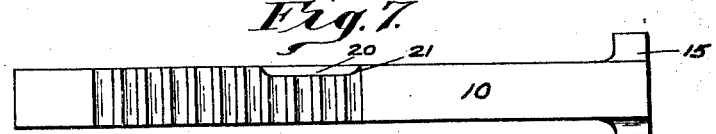
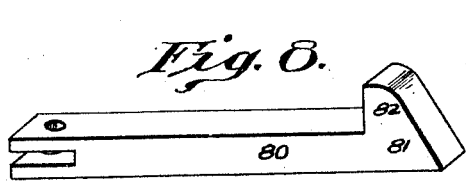

1,675,673

UNITED STATES PATENT OFFICE.

ROBERT D. STROUP, OF MARFRANCE, WEST VIRGINIA, ASSIGNOR OF ONE-THIRD TO H. S. NELSON, OF LESLIE, WEST VIRGINIA, AND ONE-THIRD TO JOHN B. LAING, OF LEWISBURG, WEST VIRGINIA.

BRAKE MECHANISM.

Application filed September 18, 1923, Serial No. 663,360. Renewed May 3, 1928.

This invention relates to brake mechanism and more particularly to such mechanism wherein the brake is positively locked in operative position so that it cannot be released by chance or accident until such release is desired by the engineer or other operator. This application is a continuation in part of my copending application Ser. No. 653,751, filed July 25, 1923.

Attempts have been made in the prior art to secure a positively locked brake. It has been sought primarily to insure positive braking action to prevent for example runaway trains due to failure of air pressure or for other reasons. It is obvious, for example that in fluid or electrically operated brakes, if at any time there is a failure of the fluid pressure or of the electric current, the brakes will cease functioning. Then too when cars are shifted from a train to a siding, leakage of air will gradually unset an air brake so that a car standing on a grade would run away. But the devices of the prior art referred to above, which have sought to overcome these difficulties, were themselves so complicated and costly that they proved inoperative and impracticable. One of the chief reasons for this was that such prior art devices required double sets of mechanism: one for locking brakes, and the other for releasing them. The changes thus required in such devices from the brakes in use at present made the change prohibitive.

One of the objects of this invention is to provide locking mechanism for a brake which will be positive and under the control of the engineer or other operator at all times.

Another object of this invention is to provide such locking mechanism of simple and efficient construction.

A further object of this invention is to provide simple and efficient releasing mechanism for the locked brake.

A further object of this invention is to eliminate the use of retainers.

A still further object of this invention is to provide such mechanism so that it may be applied to the brakes now in use with a minimum replacement and consequent scrapping of the old working parts.

Other and further objects and advantages of this invention will appear from the more detailed description set forth below by way of illustration, in connection with which description the drawings show in Figure 1, a plan view of the brake-operating mechanism; in Figure 2, a side elevation of the device; in Figure 3 an end view of the device; in Figure 4, a vertical sectional view through the center of the mechanism; in Figure 5, a detail partly in section of the releasing and locking pawls after initial operation; in Figure 6, a detail partly in section of the releasing pawl in operative position; in Figure 7, a detail of an improved holding bar; in Figure 8, a detail of an improved releasing rod; in Figure 9, the rocking dog; in Figure 10, a modified releasing rod; and in Figures 11 and 12 an improved locking pawl.

But it will be understood that the description and drawings are to be taken as illustrative only, and not by way of limitation since various changes and modifications may be made in the devices illustrated and described, by those skilled in the art to which they appertain without departing from the spirit and scope of the invention.

In general it will be seen that this invention comprises exceedingly simple means for positively locking and releasing brakes which may be applied to brakes of all kinds whether operated manually, electrically, or by fluid pressure, for example air, steam, etc. For purposes of illustration however the device is shown in use with air pressure brakes.

In its fundamental aspect the invention sets forth means operated by the existing air brake cylinder to lock the brake in operative position after it has been set, and means for releasing the locking mechanism also operated by the same cylinder. As a result it is possible to make use of practically the present equipment on trains with but slight modification. As set forth above, this invention may be applied to any type of brake, although it is illustrated with an air brake. But all that is required is that there shall be a holding bar or its equivalent, which is operated by the brake operating mechanism in its usual course of operation. This bar is then locked by the locking means, and may be subsequently released by the releasing means. It is immaterial for the purposes of the present invention whether the holding bar is operated by fluid pressure, electrically, or otherwise. Its application to any of these brakes will be obvious from the detailed description.

In my copending application referred to above, there is shown by way of illustration, the conventional brake cylinder 1 within which reciprocates the usual piston 2, actuating piston rod 3, which extends through the cylinder head 4. In this modification of the invention, the usual cylinder head is replaced by one similar to that shown in the drawings. This cylinder head 4 thus carries a small cylindrical member 5, through an opening in which the piston rod 3 extends. Upon this chamber 5 there are two strips 7, 7 which may be made integral with the member 5, and preferably are so made, these strips acting to form a channel 8 within which the holding bar reciprocates.

The holding bar 10 carries a rack 11 on its upper face which extends from the inner end of the bar for about half of its length although this exact distance is governed by other considerations, for example, by the requirements of the I. C. C. who require a certain minimum distance of operation before brake action shall begin. On its outer end 14, the bar 10 carries a depending ear 15 provided with an aperture or opening through which opening the brake rod link 20′ passes to the brake rod, and serves to transmit the motion from the piston rod to the brake rod, whereby the brake is operated. Due to the bifurcated ear 22′ of the link, by means of which it is connected to the brake rod, when the bar 10 has advanced to its locked operative position, the link cannot move inwardly, but its movement in that direction is obviously limited by the ear 15. One side of the bar 10 is cut away to form a groove 20 which is beveled at 21 to the side of the bar. This groove is made to receive the releasing pawl described below.

A cover plate 30 serves to form a housing for the locking pawl 40 and releasing pawl 50. For this purpose it is provided with a vertically extending hood 31 which has vertical sides 32 and 33 forming the channel within which the locking pawl 40 operates. The side 33 is formed as shown at 34 to provide a bearing surface for the rocking arm 73. The remainder of the channel within which the locking pawl moves is formed by a block 35, provided on its upper face with the lower half of the bearing surface for the rocking arm 73. In the preferred form, the block 35 is integral with the cylinder head 4. The cylindrical member 5 of the cylinder head 4 carries an opening through which the bar 10 moves. The lower end of the channel referred to above is thus open to the bar 10 so that the locking pawl 40 may contact with the upper face thereof.

This locking pawl 40 is cut away as at 41 to form an opening for purposes described below. The pawl is beveled at its lower end 42 so that it can coact with the teeth of the rack bar 10. At one side of the pawl, a longitudinal channel 43 is cut to receive the releasing pawl 50.

The releasing pawl 50 is pivoted at 51 for transverse movement in the channel 43, the arm 35 adjacent this pawl being cut away as at 36 to allow such movement. The pawl 50 has its lower end extended beyond the beveled edge of the locking pawl 40 to form an extension 52. The releasing pawl 50 is spring pressed as shown at 54 so that in its normal position the releasing pawl presses against the side 21 of the rack bar. In its operative position however, the pawl 50 rides in the groove 20 of the rack bar.

The rocking arm 73 carries a lug 74 rigidly attached thereto as at 75. This lug extends within the opening 41 adjacent to the upper part thereof, so that when the rocking arm is rocked counterclockwise on its bearings, the lug serves to raise the locking pawl in the hereinbefore described channel. In order to retain the locking pawl in contact with the teeth of the holding bar 10, a block 44 held in place in any desired way is reposed against the action of a spring 45, acting between this block and the lower edge of the opening or passageway 41, serves to press the locking pawl down against the teeth of the bar 10. The spring 45 may be retained in proper position by means of any ordinary securing devices, such as lug 46 in the block and recess 47 in the locking pawl.

The end of the rocking arm 73 is adapted to receive a rigidly connected arm 77 which carries a dog 78 pivoted for free clockwise movement only, to arm 77 as at 79. If moved counterclockwise it moves the arm 77.

Further there is also attached to the piston 2, a trip rod or releasing rod 80, formed at its outer end with an ear 81, which is designed to ride against the dog 78, when the piston is operated so that the movement of the piston carries the ear against the dog, trips the latter, which in turn causes the rocking arm to move and actuate the locking pawl.

When the device has been assembled with the parts related as described above, it is ready for use and operates as follows. When the engineer applies the brakes, the piston rod moves outwardly and by means of the brake rod the brakes are brought into operative position. At the same time, the piston moves against the inner end of the bar 10, carrying it out until, when the movement has been sufficient, the teeth of the rack engage the pawl 40, which then locks the rack against inward movement. Now at this time regardless of what happens either to the air line, or within the cylinder, the brake rod is positively locked in position, so that the brakes cannot be released until the engineer under whose control the entire mechanism is placed, desires to do so. In this way it will be seen that although the air pressure in the line may vary, or decrease due to leakage, the brakes are positively locked so that the train cannot move until desired. In this connection attention is called to the fact that under I. C. C. specifications, the brake rod, or piston rod, must move a minimum distance (about three and a half inches) for leakage groove, before the brake shall begin to operate. Advantage is taken of this fact in the present invention as set forth above. The rack bar is not toothed thruout its entire length, but is left untoothed in that part of the rack bar that will ride under the locking pawl during the travel of the piston through the distance referred to above. Consequently at this time when the brakes are being set, the dog is tripped by the ear on the releasing arm 80 but since the rack bar at this point is not toothed, the pawl, immediately drops back to its normal position, as does the releasing pawl. When the brakes are thus once set and locked as described above, the piston and piston rod may return to normal position and do so, under the action of the spring, described above, the ear on the releasing arm 80 riding under the dog without tripping it in this reverse movement, that is without reciprocating the rocking arm due to the pivoted connection between the arm and the dog.

When however it is desired to release the brakes and allow them to cease their braking action, the engineer once more applies the brake but it is only necessary to move the piston a small distance, namely until the sliding or releasing arm 80 thru the ear, trips the dog. In other words, regardless of the pressure that has been used to set the brakes, a minimum pressure only is required to release them. One to two pounds may be sufficient. In this way a remarkable saving in air is effected. At this time, the locking pawl is raised as described above. The releasing pawl is thus raised until it rests in the groove 20 and due to the spring 54 it is maintained therein. In this position the releasing pawl prevents the locking pawl from dropping into contact with the rack of the holding bar 10. The locking pawl thus being held out of operative position, the bar 10 is free to move inwardly until it once more contacts with the piston, when in its normal position and remains there. At the same time that the bar 10 is travelling inwardly, the releasing pawl is riding in the groove 20 until it reaches the beveled edge of it when it is then urged out of the groove and drops to its normal position allowing the locking pawl to drop down on to the upper face of the bar 10. The brakes are now in normal position and ready for further operation.

However when a car is switched off of a train or line of cars, it is desirable to provide means whereby the brake may be released and restored by hand. This is accomplished as follows. There is attached to the tripping arm 77 at a point preferably as far as possible from its upper end, a chain or equivalent device 90 which is adapted to be wound up or pulled over by a vertical hand brake staff similar to that now in use on hand brakes. It is obvious that when the element 90 is pulled over or wound up by operation of a hand wheel etc., the rocking arm 73 will be operated to release the locking pawl so that the brake rod may return to its normal position under the action of the spring.

While most of the subject matter explained above is to be found in my copending application, the present application is more particularly concerned with certain improvements thereof which enable me to obtain unexpected results. Of primary importance in this connection the bar 10 has been modified. In the earlier construction the groove 20 ran from its starting point to the end of the bar 10. In the present modification the groove extends for only a portion of the distance of the rack, and terminates in a beveled portion 22 which leads up to the side of the bar similar to the edge thereof 21. The advantages of this construction will be set forth below.

In connection with the modified bar it has been found desirable to modify the ear of the release bar 80, although this modification is not essential as the modified bar 10 may be used without any change in the bar 80. Figures 8 and 10 illustrate such a modified bar 80. In Figure 8, the ear 81 has been carried upwardly to form a well rounded edge 82 over which the dog 78 moves. The ear 81 after forming the edge 82 may drop down sharply to the edge of the bar 80 as shown in Figure 8 or it may be continued over to form an extension 83. It will be obvious that either of these modifications may be used separately or they may both be used on the same releasing bar.

The locking pawl 40 has been modified as shown in Figures 11 and 12. For example it has been found that due to the weight of the parts when assembled, the spring 45 with its attendant parts may be omitted. As a result this pawl is much simplified and may take the form 40' provided with an opening 41' which receives the lug 74 of the rocking arm 73. This pawl may terminate in a single beveled edge 42 as shown in the earlier type of devices but it is preferably formed into several teeth 42' which serve for a better grip on the bar 10. The pawl 40' also carries the longitudinal channel 43' in which the releasing pawl 50 is pivoted thru the pivot openings 51'. The recess 54' forms a seat for the spring 54 which presses against the upper end of the pawl 50.

The operation of the modified mechanism is substantially similar to that described above, but due to certain of the modifications, results are possible with the improved device that are not possible with the old device. For example, when the releasing pawl has been brought into operative position as described above, it rides in the groove 20. Now when it is desired to go into "emergency" position, and apply full pressure, the bar 10 will move outwardly. As the groove 20 rides under the pawl 50, the point 22 will be reached and ultimately the pawl 50 will be urged out of the groove, and thus drop to its inoperative position as shown in Fig. 5. The brakes will thus be locked in their set position.

If now it be desired to release them, all that is necessary, is that sufficient pressure be applied to move the releasing arm 80 outwardly until the ear 81 trips the dog 78. When so tripped, the dog rocks the arm 73 and operates the pawl 40 lifting it out of contact with the bar 10. As soon as this happens, the bar 10 may move inwardly, and although it is in this position for a relatively short time only, there is enough "throw" on the brakes, to move the bar 10 inwardly. However in order to lengthen the time within which this "throwing" action may come into play, the modified release rod is used, since as the dog rides over the lengthened surface or edge 82 or 83, the time is increased within which the pawl 40 is out of contact with the bar 10. In such cases the modified bar 80 is very desirable although not absolutely necessary.

At times it is desirable to use this invention without the releasing pawl, and in such cases the latter may be easily eliminated. Such omission allows one to drop from a higher to a lower pressure without first going through the releasing operation. This result follows from the fact when the brakes have once been set and locked, when no releasing pawl is used, all that is necessary is that the engineer should move the brake to the pressure that he desires. As the ear 81 of the bar 80 passes the dog 78, the latter is tripped rocking the arm 73 and moving the pawl out of contact with the bar 10. At this time as just explained above, the "throw" of the brakes will tend to restore the parts to their normal position. As soon however as the brake rod and piston rod move back to the point where the rack bar 10 has been locked, they cannot move further and are therefore locked at the lower pressure position.

The cover plate 30 serves to protect the working parts against dirt etc., and may also be provided with oil cups etc. in order to lubricate the working parts.

Having thus set forth my invention, I claim:

1. In brake mechanism, a holding bar provided with a rack, a pawl engaging said rack to lock said bar against movement in one direction, a groove in said bar extending for a portion of the length of said bar only, a releasing pawl carried by said locking pawl and adapted to ride in the groove aforesaid, and to control the engagement of the locking pawl with the rack of the holding bar.

2. Brake mechanism as set forth in claim 1 wherein means are provided for removing said releasing pawl out of said groove so that the locking pawl may reengage said rack.

3. In brake mechanism, a holding bar provided with a rack, and a groove in said bar extending over a portion only of the length of said rack.

4. In brake mechanism including a tripping dog, an arm provided with an ear having an enlarged upper surface for engaging said dog.

5. In brake mechanism, a releasing arm provided with an ear having an extension thereof, to prolong its working surface.

6. In brake mechanism, a holding bar provided with a rack over a portion of one face of said bar, a groove in said bar extending for a portion only of the length of said rack, a locking pawl adapted to engage the rack of said bar, means for moving said locking pawl out of engagement with said rack, said means comprising a releasing arm provided with an extended ear.

7. In brake mechanism, a locking pawl provided with a toothed engagement face, and a releasing pawl carried by said locking pawl.

8. In brake mechanism, a holding bar, means for locking said bar against movement in one direction, means for releasing said locking means, and means for lengthening the time during which the locking means is released.

9. In brake mechanism, means for holding the brake in set position, means for locking said holding means, means for releasing said locking means, and means for lengthening the time during which the locking means is tentatively released.

10. In brake mechanism, a holding bar provided with a rack over a portion of one face of said bar, a groove in said bar extending for a portion only of the length of said rack, a locking pawl adapted to engage the rack of said bar, and means for releasing the locking means.

Signed at Marfrance, this 15th day of September, 1923.

ROBERT D. STROUP.